United States Patent
Peterson

(10) Patent No.: US 10,072,985 B2
(45) Date of Patent: Sep. 11, 2018

(54) DETECTOR HOUSING ASSEMBLY

(71) Applicants: Bosch Security Systems, Inc., Fairport, NY (US); Robert Bosch GmbH, Stuttgart (DE)

(72) Inventor: Craig Peterson, Penfield, NY (US)

(73) Assignees: Bosch Security Systems, Inc., Fairport, NY (US); Robert Bosch GmbH, Stuttgart (DE)

( * ) Notice: Subject to any disclaimer, the term of this patent is extended or adjusted under 35 U.S.C. 154(b) by 380 days.

(21) Appl. No.: 14/922,804

(22) Filed: Oct. 26, 2015

(65) Prior Publication Data

US 2017/0115165 A1    Apr. 27, 2017

(51) Int. Cl.
| | | |
|---|---|---|
| *G01J 5/04* | (2006.01) | |
| *G08B 13/19* | (2006.01) | |
| *G01J 5/00* | (2006.01) | |
| G08B 13/191 | (2006.01) | |
| G08B 13/196 | (2006.01) | |

(52) U.S. Cl.
CPC ............ *G01J 5/04* (2013.01); *G01J 5/0022* (2013.01); *G08B 13/19* (2013.01); *G08B 13/191* (2013.01); *G08B 13/19619* (2013.01)

(58) Field of Classification Search
CPC .......... G01J 5/04; G01J 5/0022; G08B 13/19; B65D 7/12
See application file for complete search history.

(56) References Cited

U.S. PATENT DOCUMENTS

| | | | |
|---|---|---|---|
| 5,418,567 A * | 5/1995 | Boers | G08B 13/19619 348/143 |
| 5,757,004 A | 5/1998 | Sandell et al. | |
| D628,103 S | 11/2010 | Schmalz et al. | |
| D666,512 S | 9/2012 | Gresko et al. | |
| 8,455,831 B2 | 6/2013 | Santos et al. | |
| 2005/0200494 A1 | 9/2005 | Herrmann et al. | |
| 2007/0292121 A1* | 12/2007 | Sato | G08B 13/19619 396/144 |

(Continued)

FOREIGN PATENT DOCUMENTS

WO    2015128114 A1    9/2015

OTHER PUBLICATIONS

Bosch Blue Line Gen2, PIR Motion Detector, ISC-BPR-W12 Installation Manual, 2011 Bosch Security Systems.
(Continued)

*Primary Examiner* — David Porta
*Assistant Examiner* — Mindy Vu
(74) *Attorney, Agent, or Firm* — Kelly McGlashen; Maginot Moore & Beck LLP

(57) ABSTRACT

A housing assembly includes a base and a front assembly assembled with the base. The base includes a bottom and a sidewall that surrounds a peripheral edge of the bottom, and the front assembly is configured to engage with the sidewalls and close an open end of the base. The front assembly includes a latch that protrudes inward from an inner surface, and a spring-biased cam is rotatably supported on the base. The cam includes a cam surface that is engaged with the latch in such a way that rotation of the cam about the rotational axis results in a translation of the front assembly relative to the base in a direction parallel to the cam rotational axis. The cam is manually actuated using a tool.

18 Claims, 11 Drawing Sheets

(56) References Cited

U.S. PATENT DOCUMENTS

2008/0266393 A1* 10/2008 Park ................ G08B 13/19619
348/143
2009/0166538 A1* 7/2009 Buckley ................ G01J 5/0022
250/340
2010/0237248 A1 9/2010 Walters et al.

OTHER PUBLICATIONS

International Search Report for PCT Application PCT/EP2016/073941 dated Nov. 29, 2016 (5 pages).

* cited by examiner

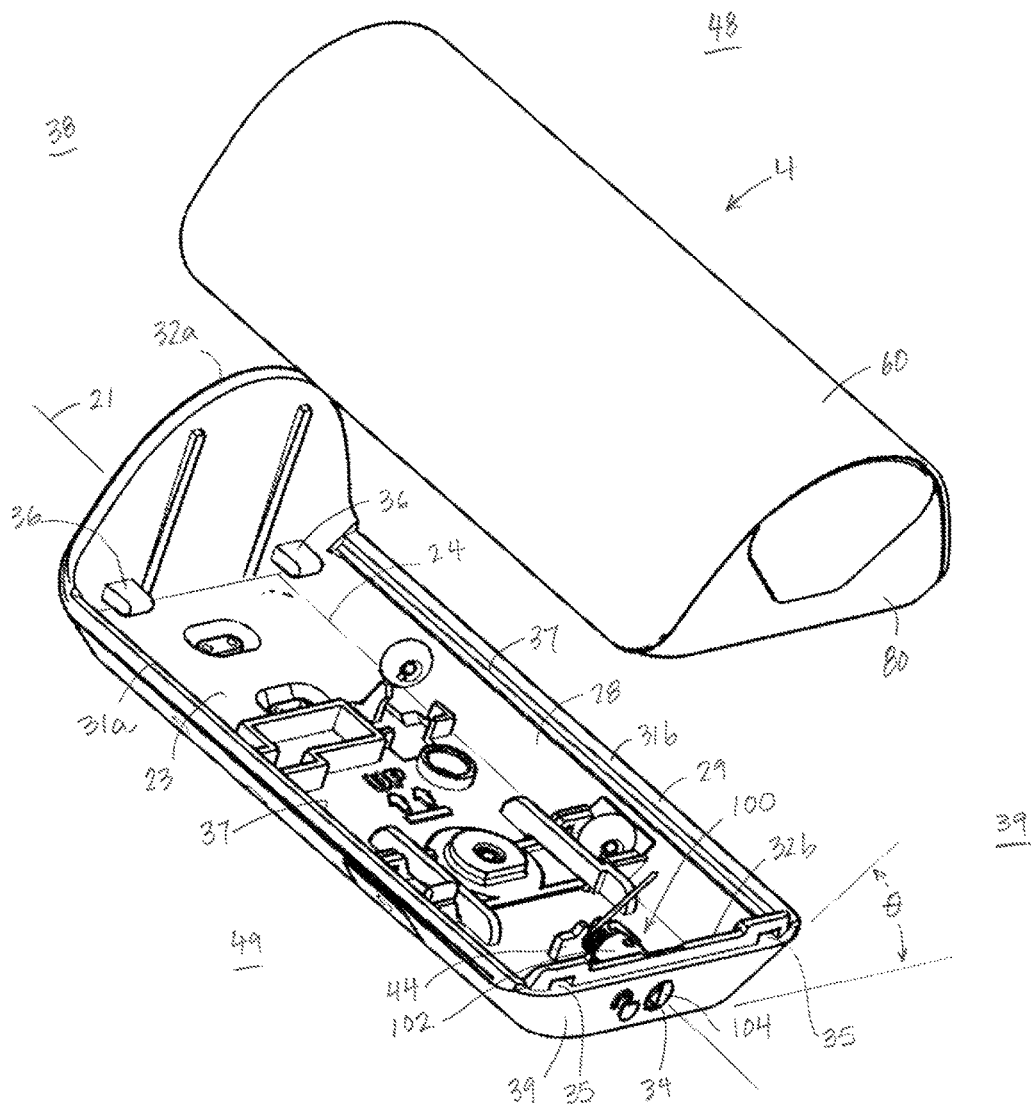

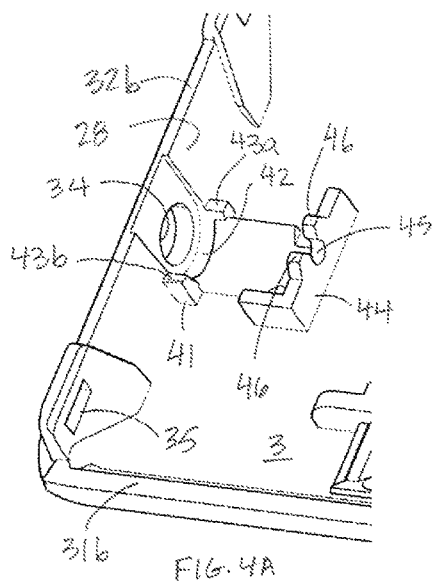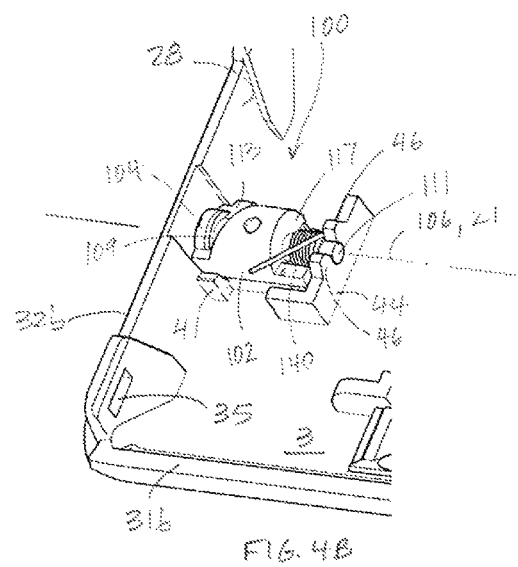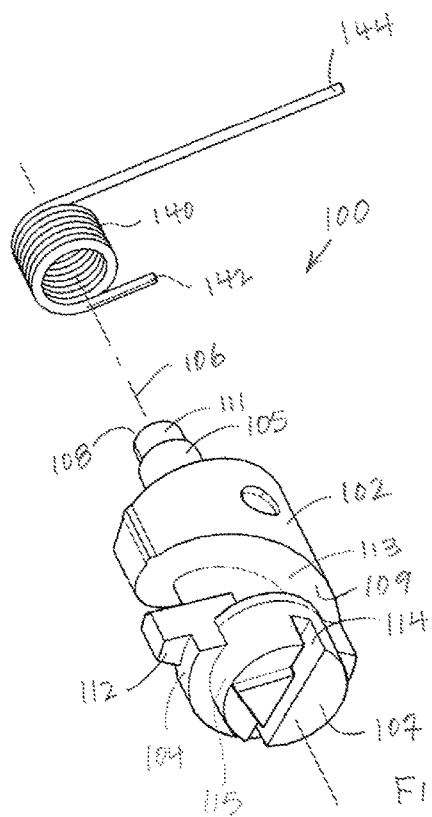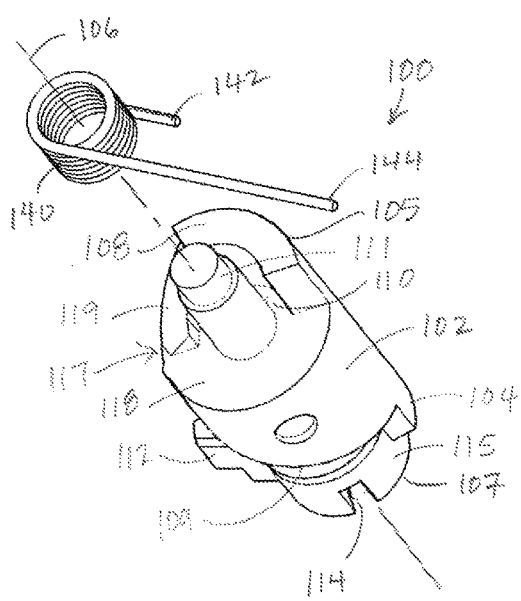

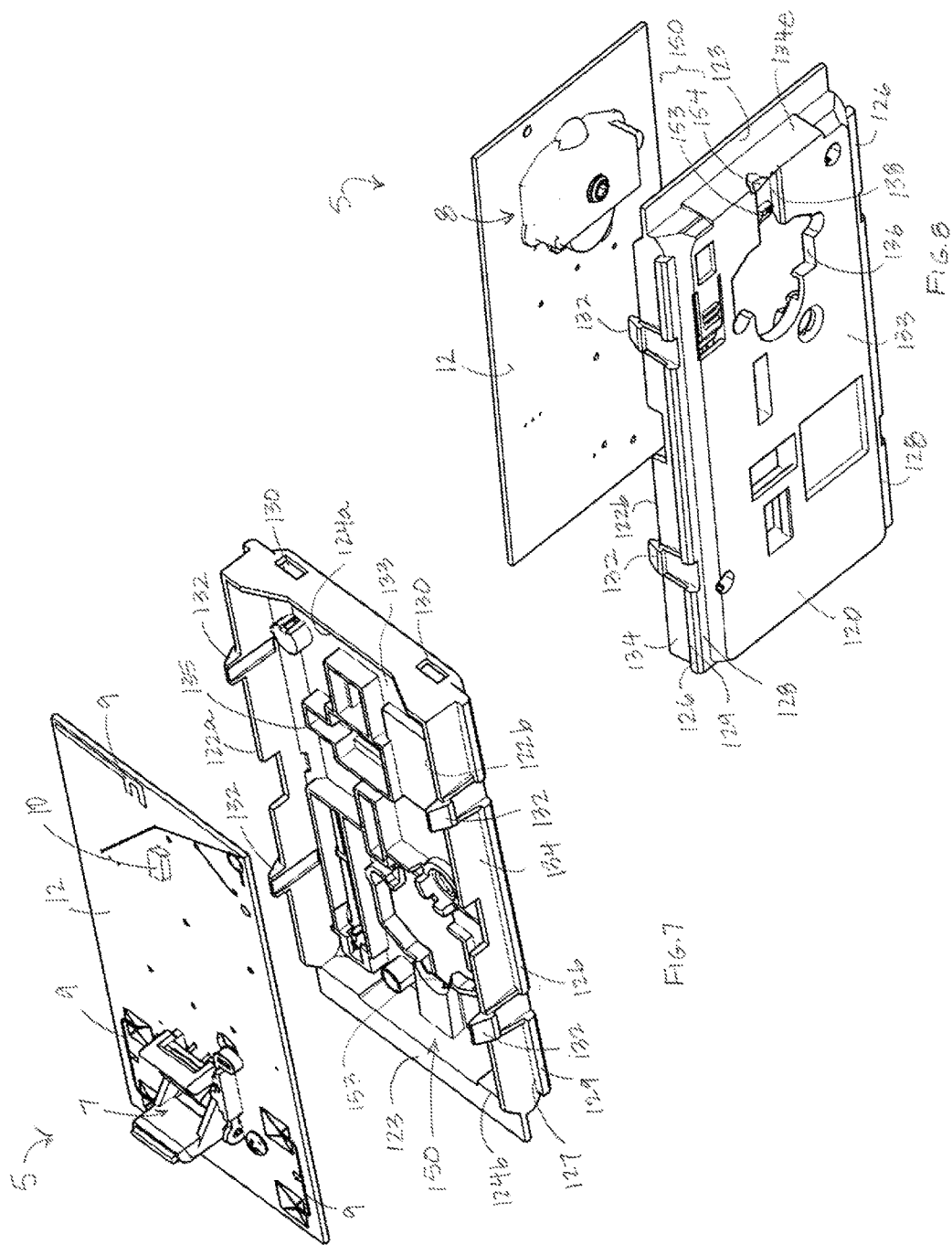

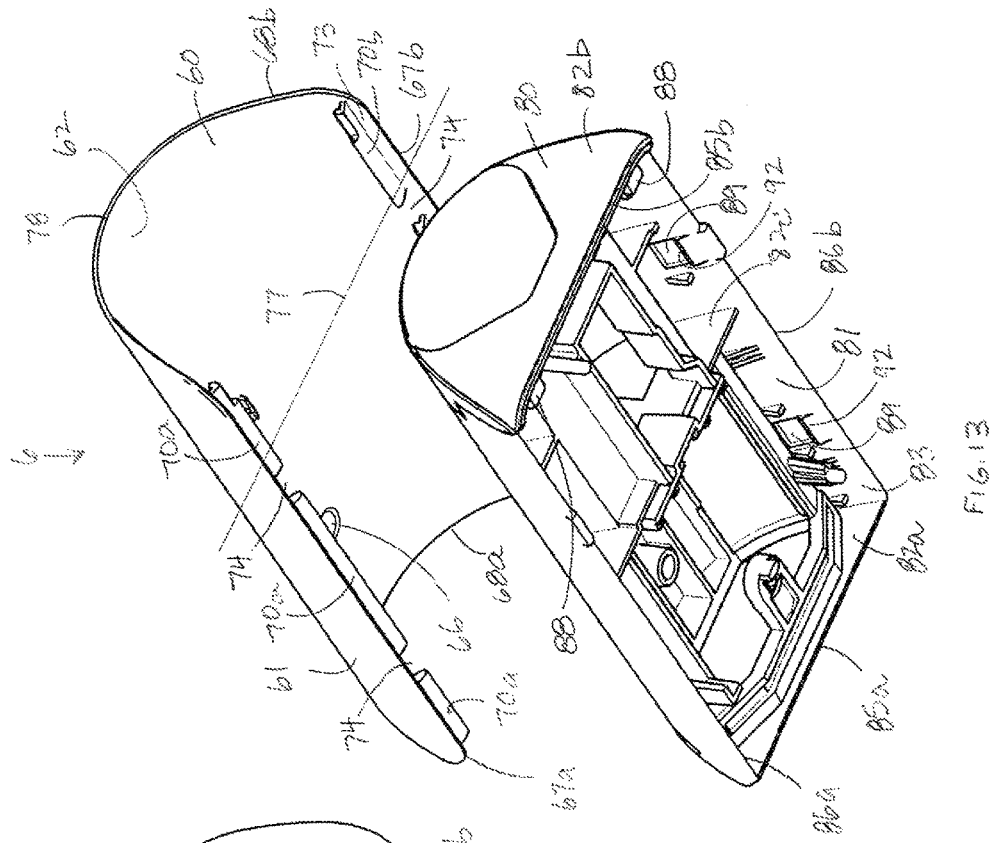
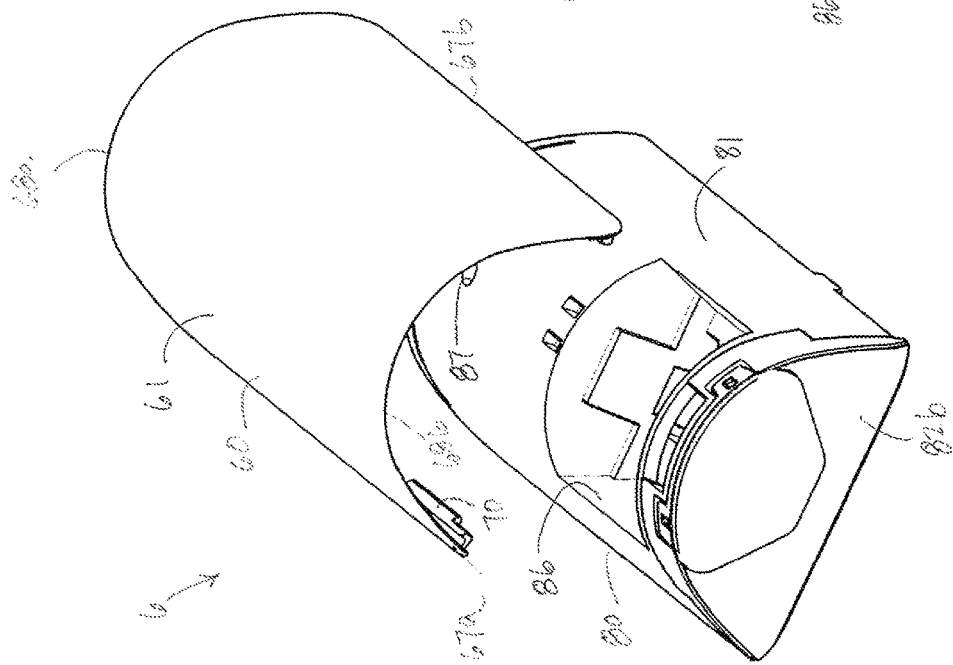

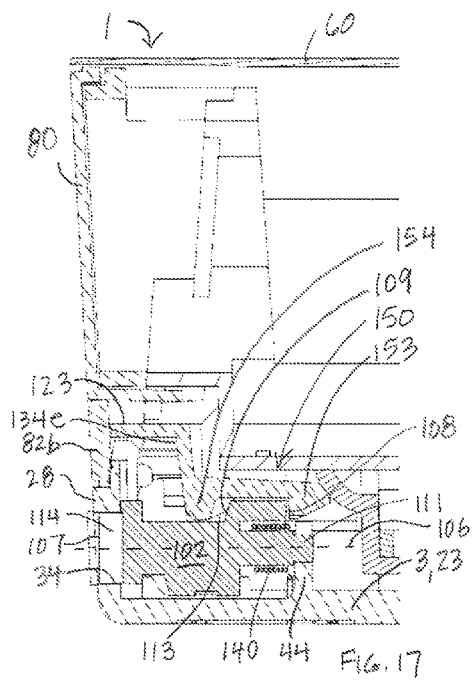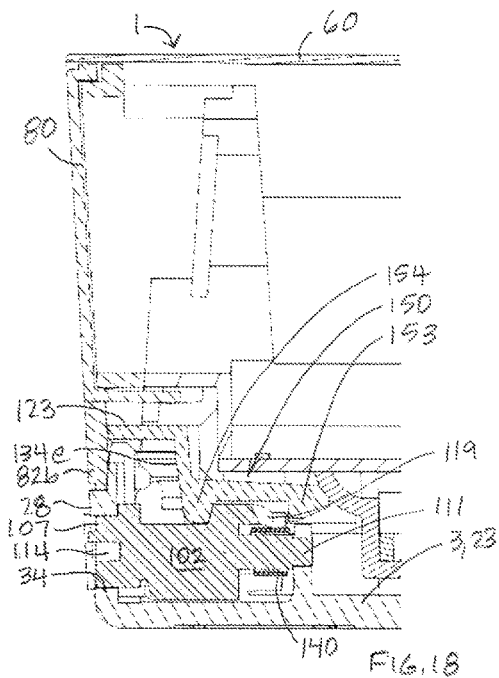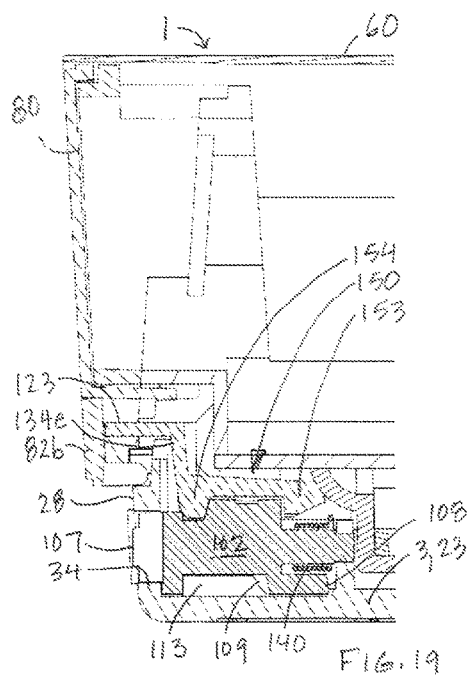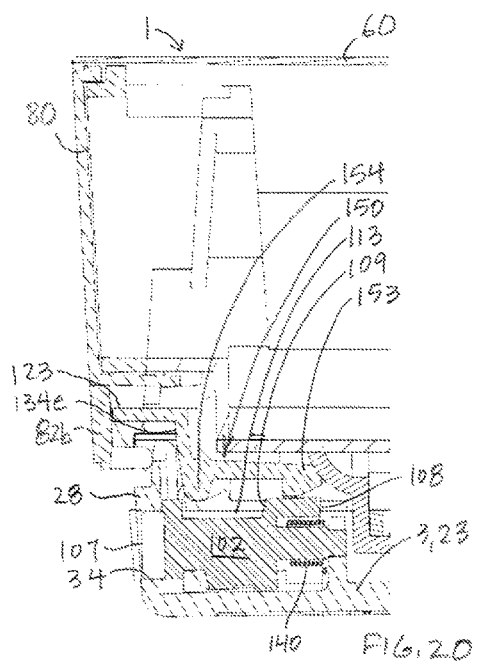

DETECTOR HOUSING ASSEMBLY

BACKGROUND

1. Field of the Invention

The present invention relates to a motion detection device, and, more particularly, to a motion detection device using a passive infrared (PIR) motion sensor supported in an auto-locking and auto-ejecting housing.

2. Description of the Related Art

It is known that all objects transmit a level of infrared radiation that varies with the temperature of the object. Taking advantage of this characteristic, passive infrared (PIR) motion sensors are used as motion detectors to detect motion of a relatively warm body that emits a relatively high level of infrared radiation, such as a human intruder or motor vehicle. If the level of infrared radiation in the vicinity of the motion detector changes by a predetermined amount, then the motion detector produces an output signal. The output signal indicates that the motion detector has sensed the motion of a warm body. In an environmental control system, the output signal may be used to trigger turning on of a light. In a security system, the output signal may be used to trigger an alarm indicating the presence of an intruder.

The PIR motion sensor is supported within a detector housing that is typically mounted on a wall of a room that is to be monitored, for example in an upper corner of the room. It is desirable to provide a detector housing that can be easily opened for battery change by the user while also permitting secure locking to prevent tampering.

SUMMARY

In some aspects, a housing assembly includes a base, a front assembly configured to engage with the base, a latch that protrudes inward from an inner surface of one of the front assembly and the base, and a cam supported on the other of the front assembly and the base. The cam is rotatable about a rotational axis and includes a cam surface that is engaged with the latch in such a way that rotation of the cam about the rotational axis results in a translation of the front assembly relative to the base in a direction parallel to the rotational axis.

The housing assembly may include one or more of the following features: The base includes a bottom and a sidewall that surrounds a peripheral edge of the bottom, the sidewall includes a port, and the cam is supported within the base such that a first end of the cam is disposed in the port. In addition, the latch includes a proximal end fixed to the front assembly, a distal end defining a latching tooth, and a drive tooth disposed between the proximal and distal ends that is engaged with the cam surface in some rotational orientations of the cam and is disengaged from the cam surface in other rotational orientations of the cam. The cam is rotatable between a locked position in which the front assembly closes all of an open end of the base, the latching tooth engages an end face of the cam and the driving tooth is spaced apart from the cam surface, and an unlocked position in which the latching tooth is spaced apart from the end face of the cam and the driving tooth is engaged with the cam surface. The housing assembly comprises a spring that biases the cam toward the locked position. The cam is rotatable to an ejecting position in which the driving tooth is displaced relative to a position of the drive tooth when the cam is in the locked position, whereby the front assembly is displaced relative to a position of the front assembly when the front assembly is in the closed position. The first end of the cam includes surface features configured to engage with a tool. The cam surface of the cam is helical in shape.

The housing assembly may also include one or more of the following features: The base includes one of a retaining hook and a retaining eye, the front assembly includes the other of the retaining hook and the retaining eye, and the retaining eye is configured to receive and retain the retaining hook. When the front assembly is in a closed position relative to the base, the retaining hook is disposed within the retaining eye such that the front assembly is retained in the closed position relative to the base, and when the cover is translated relative to the base via the cam, the retaining hook is released from the retaining eye such that the front assembly is removable from the base. The cam includes an annular groove that at least partially surrounds the cam second end, and at least a portion of a spring is disposed in the groove. The spring is a torsion spring including one end disposed in the groove and another end that abuts the housing base. One end of the cam includes an axially extending post, a bearing member protrudes from the bottom of the base, and the post is rotatably supported on the bearing member. A bearing member protrudes from the bottom of the base, and the cam includes a radially-protruding stop that is configured to limit the rotational travel of the cam by engaging a portion of the bearing member at a predetermined rotational orientation of the cam. The housing assembly further comprises a sensor assembly supported on the base, the sensor assembly including a support frame and a printed circuit board that is supported on the support frame. In addition, the housing assembly comprises a sensor electrically connected to, and supported on, a surface of the printed circuit board that faces away from the support frame, and a lens that forms an outer surface of the front assembly and is configured to direct light toward the sensor. The lens encloses a peripheral edge of the base and overlies the sensor.

In some aspects, a method of manipulating a housing assembly is provided. The housing assembly includes a base, a front assembly configured to engage with the base, a latch that protrudes inward from an inner surface of one of the front assembly and the base, and a cam supported on the other of the front assembly and the base. The cam includes a cam surface that is engaged with the latch in such a way that rotation of the cam about the rotational axis results in a translation of the front assembly relative to the base in a direction parallel to the rotational axis. The method includes rotating the cam about a rotational axis to an extent that the front assembly translates relative to the base in a direction parallel to the rotational axis.

In some embodiments, the housing assembly further comprises an eye that protrudes from one of the front assembly and the base, and a hook that protrudes from the other of the front assembly and the base and is configured to be received within the eye. In addition, rotation of the cam about the rotational axis by a predetermined amount results in translation of the front assembly relative to the base between a locked position in which the hook is received within the eye, and an unlocked position in which hook is spaced apart from the eye. The method includes rotation of the cam about the rotational axis by the predetermined amount to place the housing assembly in the unlocked position, and when the housing assembly is in the unlocked position, lifting the front assembly off the base.

A motion detection device includes a PIR motion sensor supported within a housing. The housing includes a tray-like base and a front assembly that is supported in a desired position and orientation relative to a mounting surface by the base. The front assembly includes a cover subassembly that forms an outermost surface of the front assembly. The cover subassembly includes a Fresnel lens that overlies the sensor and directs infrared radiation toward the PIR motion sensor. For ease of handling and for security purposes, the housing includes an automatic locking mechanism. The mechanism is configured such that when the front assembly is placed in a closed position with respect to the base, the front assembly is automatically locked to the base. A manually-operated tool such as a screwdriver is required to unlock the mechanism and release the front assembly from the base.

The locking mechanism includes an ejection feature such that the unlocking action of the tool serves to partially separate the front assembly from the base. In particular, the mechanism includes a cam member that is rotated via the tool, and rotation of the cam results in a translation of the front assembly relative to the base in a direction parallel to the cam member rotational axis. The cam member is spring biased toward the locked position, whereby upon release of the tool, the mechanism is automatically reset, permitting the front assembly to be automatically locked in place when reassembled on the base.

In addition to providing locking and cover-ejecting features, the locking and unlocking mechanism is positioned within a port formed in an end of the detector, whereby it has an unobstructive appearance. Moreover, since the mechanism is used to detach the front assembly from the base, no exterior surface features that permit finger purchase are required, contributing to an overall clean appearance of the detector device.

BRIEF DESCRIPTION OF THE DRAWINGS

FIG. 3 is an exploded perspective view of the front assembly and the base that form the motion detection device as seen from the front and the second end of the device.

FIG. 4A is a perspective view of the base as seen from the front and the first end and omitting the locking mechanism.

FIG. 4B is a perspective view of the base as seen from the front and the first end and including the locking mechanism.

FIG. 7 is an exploded perspective view of the sensor subassembly as seen from the front and the first end of the device.

FIG. 8 is an exploded perspective view of the sensor subassembly as seen from the rear and the second end of the device.

FIG. 12 is an exploded perspective view of the cover subassembly as seen from the front and the second end of the device.

FIG. 13 is an exploded perspective view of the cover subassembly as seen from the rear and the second end of the device.

FIG. 16A is a detail exploded perspective view of the locking assembly as seen facing a first end of the cam.

FIG. 16B is a detail exploded perspective view of the locking assembly as seen facing a second end of the cam.

FIG. 17 is a cross sectional view of a portion of the motion detection device 1 illustrating the locking assembly in the locked position with the front assembly assembled with the base.

FIG. 18 is a cross sectional view of a portion of the motion detection device 1 illustrating the locking assembly in the unlocked position.

FIG. 19 is a cross sectional view of a portion of the motion detection device 1 illustrating the locking assembly in the ejection position.

FIG. 20 is a cross sectional view of a portion of the motion detection device 1 illustrating the locking assembly in the locked position with the front assembly displaced relative to the base.

DETAILED DESCRIPTION

Figure 1:
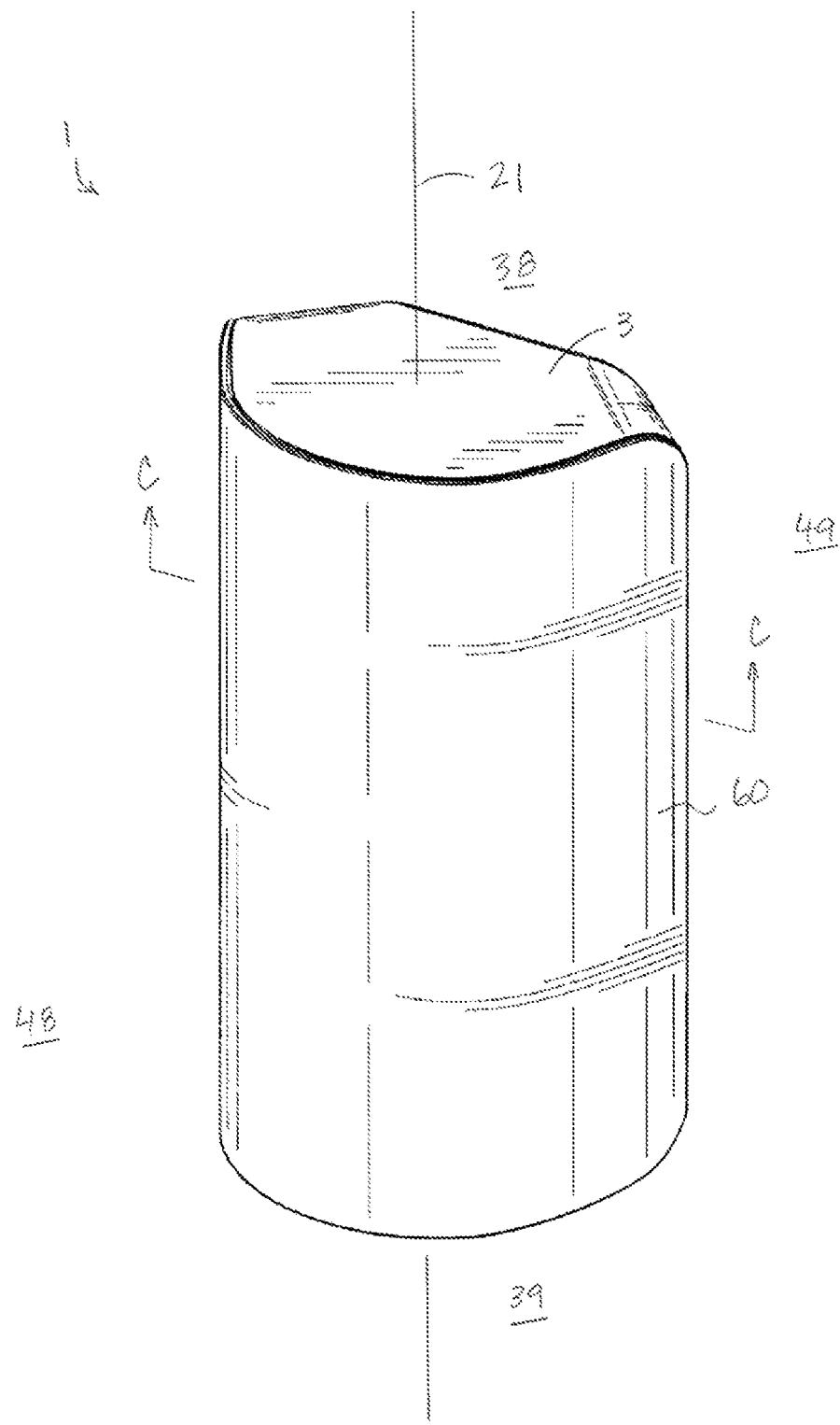
FIG. 1 is a perspective view of a motion detection device as seen from the front and the first end of the device.
Figure 2:
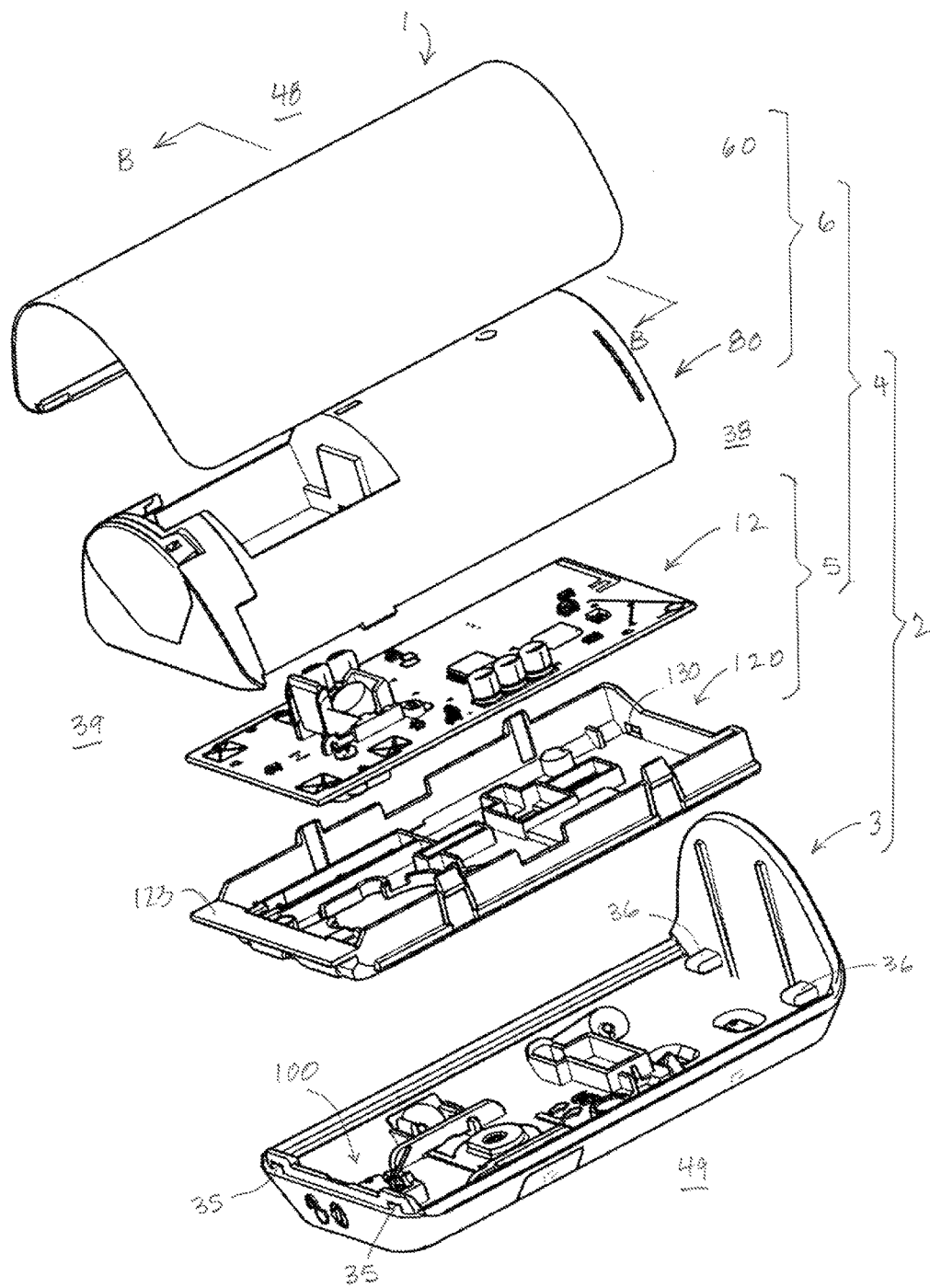
FIG. 2 is an exploded perspective view of the motion detection device of FIG. 1 as seen from the front and the second end of the device.

Referring to FIGS. 1-2, a motion detection device 1 uses a passive infrared (PIR) motion sensor 7 to detect motion of a warmth-emitting body, such as a human intruder or motor vehicle. Upon detection of a relatively high level of infrared radiation in the vicinity of the PIR motion sensor 7, the motion detection device 1 provides an output signal that can be used to trigger a subsequent action by an environmental and/or security control system. For example, a detected motion may trigger a light switch, an alarm signal, or other application. The PIR motion sensor 7 is supported on, and electrically connected to, a printed circuit board (PCB) 12 that is supported within a detector housing assembly 2. The housing assembly 2 is typically mounted on a wall of a room that is to be monitored, for example in an upper corner of the room.

Figure 6:
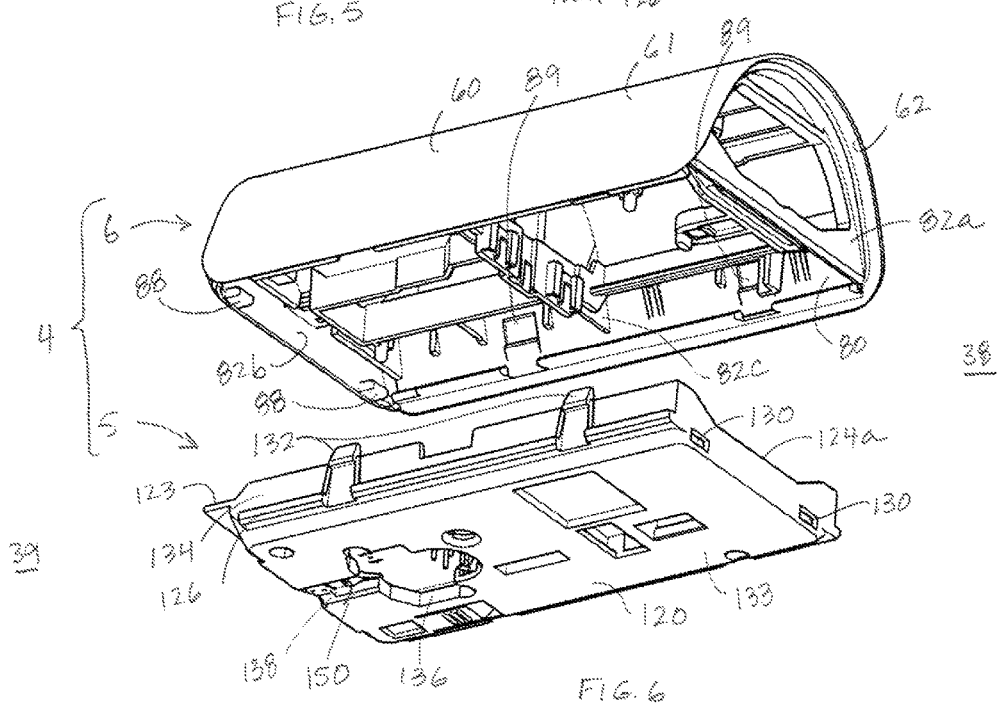
FIG. 6 is an exploded perspective view of the front assembly of FIG. 3 as seen from the rear and the first end of the device.

The housing assembly 2 includes a front assembly 4 that includes the PIR motion sensor 7 and a lens 60 that directs infrared radiation to the PIR motion sensor 7. The housing assembly 2 also includes a base 3 used to mount the front assembly 4 to a support surface such as a wall (not shown). The front assembly 4 is securely retained in engagement with the base 3 via retaining features 35, 36, 88, 130 (reference number 88 is shown in FIG. 6) that are used in conjunction with a locking mechanism 100. The front assembly 4 is selectively detachable from the base 3 to permit detector maintenance such as battery replacement. To this end, the locking mechanism 100 enables ejection of the front assembly 4 from the base 3 upon manual actuation via a tool (not shown). The retaining features 35, 36, 88, 130 and locking mechanism 100 are described in detail below.

Referring to FIG. 3, the base 3 is a tray-like member that includes a generally planar bottom 23 and a base sidewall 28 that surrounds the periphery 24 of the bottom 23. In the illustrated embodiment, the bottom periphery 24 is generally rectangular, and the base 3 includes a longitudinal axis 21 that is parallel to the long sides of the rectangular bottom 23. Correspondingly, the sidewall free end 29 includes a pair of long edges 31a, 31b that extend in parallel to the longitudinal axis 21, and a pair of short edges 32a, 32b that join, and extend transversely to, the long edges 31a, 31b. One of the short edges 32a corresponds to a first, or upper, end 38 of the housing assembly 2, and the opposed short edge 32b corresponds to a second, or lower, end 39 of the housing assembly 2. The terms "upper" and "lower", as well as the terms "front" (indicated by reference number 48) and "rear" (indicated by reference number 49), are used with reference to the orientation shown in FIG. 1, which corresponds to one of many possible orientations of the motion detection device 1 when in use.

At each of the first end 38 and second end 39 of the base, the sidewall 28 extends in a direction that is generally normal to the bottom 23. The portions of the sidewall 28 extending between the first and second ends 38, 39 extend at an angle θ (FIG. 3) relative to the bottom 23 such that a free end 29 of the base sidewall 28 circumscribes a larger area than does the bottom periphery 24. For example, in some embodiments, the base sidewall 28 extends at an angle θ of about 45 degrees relative to the bottom 23 along the long edges 31a, 31b.

A circular port 34 is formed in the base sidewall 28 at the second end 39 of the base 3. The port is configured to receive a portion of a locking mechanism 100 that is used to secure the front assembly 4 to the base 3 and to eject the front assembly from the base 3 upon actuation, as discussed further below.

Referring to FIGS. 4A and 4B, the base 3 includes features that support the locking mechanism 100 relative to the circular port. To this end, a pair of bearing members 41, 44 protrude from the bottom 23 at a location adjacent to the port 34.

The first bearing member 41 of the pair includes a low shoulder 43a and a high shoulder 43b that adjoin the sidewall 28 and are disposed on opposed sides of the port 34. The first bearing member 41 also includes a first curved surface 42 that is shaped and dimensioned to receive a cam 102 of the locking mechanism 100 in a clearance fit. In particular, the first curved surface 42 extends transversely between the low shoulder 43a and the high shoulder 43b and has a circular radius that is slightly greater than the distance between a center of the port 34 and the base bottom 23 such that portions of the first curved surface are recessed relative to the base bottom 23. The first curved surface 42 forms a cylindrically curved seat along the base bottom 23. In addition, the low shoulder 43a and the high shoulder 43b serve as stops that limit rotation of the cam 102, as discussed further below.

The second bearing member 44 of the pair is spaced apart from the first bearing member 41 along the longitudinal axis 21. The second bearing member 44 includes a second curved bearing surface 45 and high shoulders 46 on opposed sides of the second curved bearing surface 45. The second curved bearing surface 45 is dimensioned to receive a post 111 that protrudes from a second end of the locking mechanism 100. The high shoulders 46 nearly completely surround the post 111 and receive the post 111 in a snap engagement.

Referring again to FIG. 3, a slot 37 is formed in the base sidewall 28 adjacent, and in parallel, to each of the sidewall long edges 31. The slots 37 extend from the base first end 38 to the base second end 39, and are shaped and dimensioned to receive a rail 126 that protrudes along a portion of the front assembly 4, as discussed further below. The front assembly 4 is supported above the bottom 23 via the rails 126 such that a vacancy 40 (FIG. 9) exists between the front assembly 4 and the bottom 23. The locking mechanism 100 is disposed within this vacancy 40 adjacent to the first end 38 of the base 3.

The base 3 includes retaining features that retain the front assembly 4 in an assembled position in which the front assembly 4 closes the open end of the base 3. For example, in the illustrated embodiment, a pair of retaining hooks 36 are provided on the sidewall 28 of the base first end 38. The retaining hooks 36 are spaced apart in a direction parallel to the short edge 32a, and protrude in parallel to the bottom 23. The retaining hooks 36 are configured to engage with retaining eyes 130 provided on the front assembly 4, as discussed further below. In addition, a pair of retaining eyes 35 are provided on the short edge 32a of the base second end 39. The retaining eyes 35 protrude perpendicularly to the bottom 23. The retaining eyes 35 are configured to engage with retaining hooks 88 provided on the front assembly 4, as discussed further below.

Figure 5:
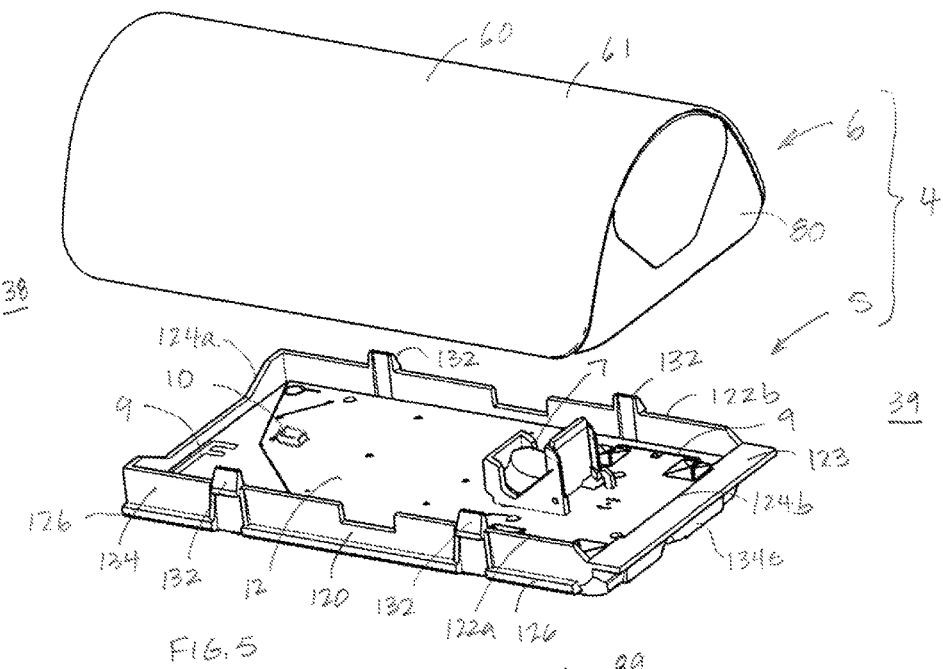
FIG. 5 is an exploded perspective view of the front assembly of FIG. 3 as seen from the front and the second end of the device.

Referring to FIGS. 5 and 6, the front assembly 4 includes two subassemblies that are snap-fit together. In particular, the front assembly 4 includes a sensor subassembly 5 and a cover subassembly 6.

Figure 9:
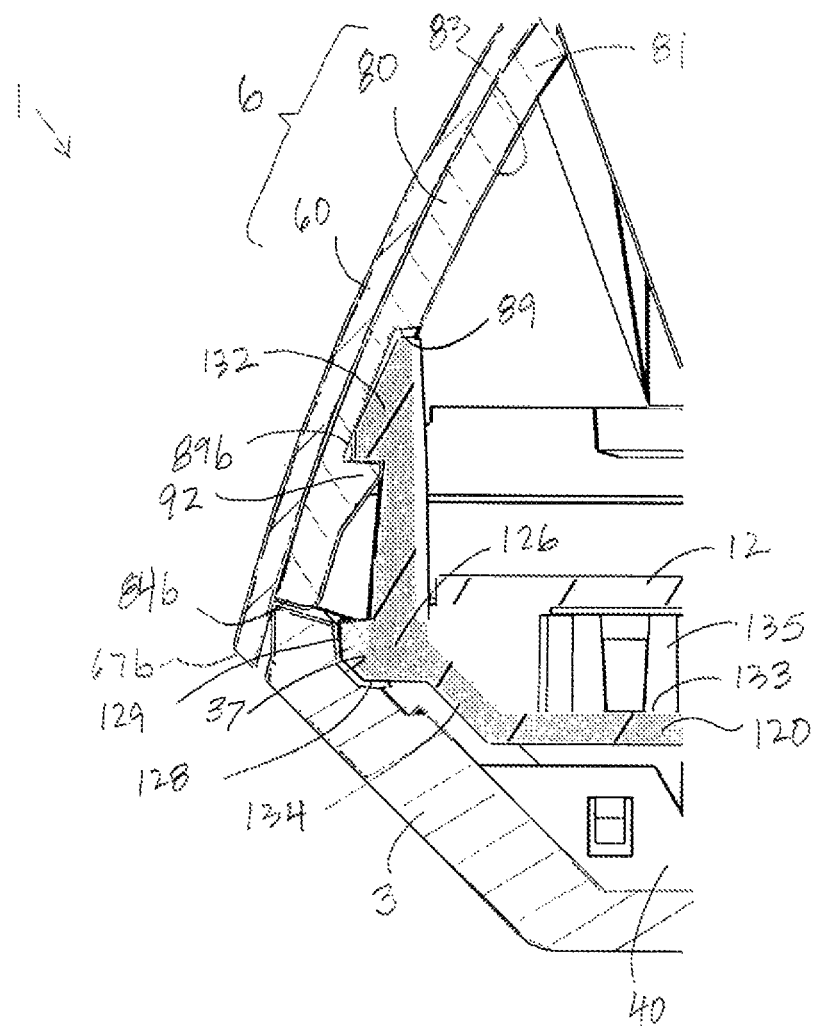
FIG. 9 is an enlarged, cross-sectional view of a portion of the housing as seen along line B-B of FIG. 2.

Referring to FIGS. 7-9, the sensor subassembly 5 includes a printed circuit board (PCB) 12 and a PCB holder 120 that supports the PCB 12. The PCB 12 is used to support PIR motion sensor 7 and electrically interconnect it with other electronic components that control and power the PIR motion sensor 7. In some embodiments, the PCB 12 supports and provides electrical interconnections for one or more additional electronic components. For example, such electronic components may include an additional sensor such as a microwave sensor 8 and associated antennas 9, and a light emitting diode (LEDs) 10 used to indicate device status.

The PCB holder 120 is configured to support the PCB 12 within the base 3, and includes a platform 133 that is surrounded by a holder sidewall 134. The peripheral shape of the platform 133 is rectangular to correspond to the shape of the base bottom 23, whereby the holder sidewall 134 includes a pair of long edges 122a, 122b that are joined by a pair of short edges 124a, 124b. The longitudinal dimension of the platform 133 is less than that of the base bottom 23, whereby the holder sidewall 134 is spaced apart from the base sidewall 28 at the base second end 39. This spacing accommodates longitudinal movement of the front assembly 4 including the PCB holder 120 relative to the base 3 during assembly and disassembly, as discussed further below. To accommodate the differences in longitudinal dimension between the platform 133 and the base bottom 23, the PCB holder 120 includes a shelf 123. The shelf 123 is disposed along the PCB holder short edge 124b at the housing second end 39, and protrudes longitudinally outward in a direction parallel to the platform 133. The shelf 123 has a longitudinal dimension sufficient to overlie, with clearance, an outer surface of the base retaining eyes 35 during assembly and disassembly of the front assembly 4 with the base 3.

The holder sidewall 134 includes a rail 126 adjacent each PCB holder long edge 122a, 122b that protrudes outward in a direction generally parallel to the platform 133. Each rail 126 is shaped and dimensioned to be received within a corresponding slot 37 formed in the base sidewall 28. In particular, an end face 129 and bottom-facing surface 128 of each rail 126 is disposed within the corresponding slot 37. As discussed further below, the front assembly 4, which is supported via the rails 126, slides in a longitudinal direction along the slots 37 during assembly and disassembly of the front assembly 4 with the base 3.

The holder sidewall 134 includes retaining features that retain the front assembly 4 in an assembled position in which the front assembly 4 closes the open end of the base 3. In particular, a pair of spaced-apart retention eyes 130 are formed adjacent one of the short edges 124a. The retention eyes 130 are spaced apart, and are sized and dimensioned to receive retaining hooks 36 provided on the base 3. The retention eyes 130 cooperatively engage with the retaining hooks 36. This feature, in combination with the locking mechanism, serves to retain the sensor subassembly 5, and thus also the front assembly 4, in an assembled configuration relative to the base 3, as discussed further below.

In addition, the holder sidewall long edges 122a, 122b each include a pair of longitudinally spaced snaps 132 that are configured to engage with corresponding recesses 89 (FIG. 9) formed in the cover subassembly 6, as discussed further below. The snaps 132 snap into and cooperatively engage with the recesses 89 to connect the PCB holder 120, and thus also the sensor subassembly 5, to the cover subassembly 6 via a snap connection to form the front assembly 4. In the front assembly 4, the cover subassembly 6 is connected to the sensor subassembly 5 on a side of the sensor subassembly 5 that is opposed to the base 3.

Figure 10:
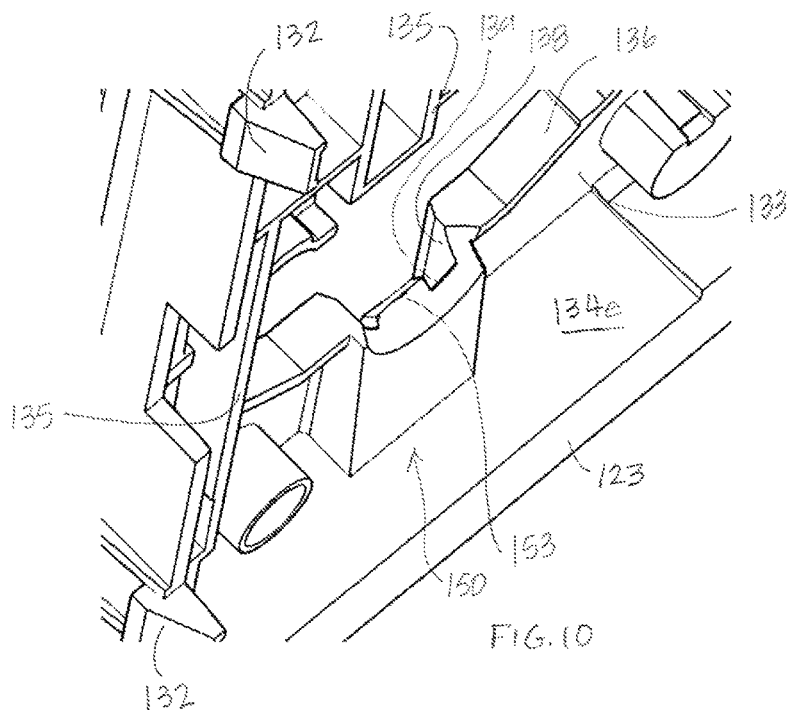
FIG. 10 is an enlarged view of an end of the PCB holder illustrating a latch as seen facing the cover subassembly.
Figure 11:
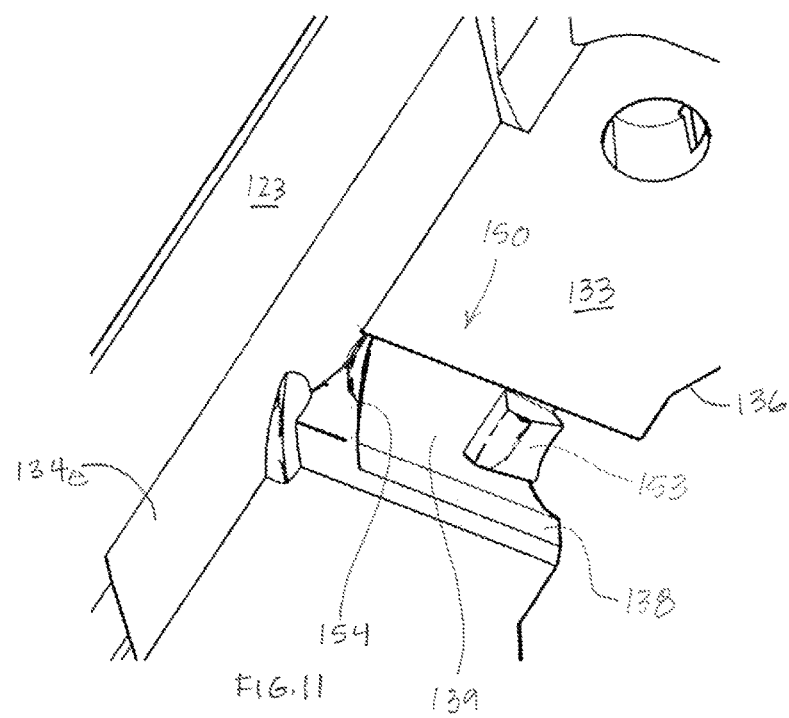
FIG. 11 is an enlarged view of an end of the PCB holder illustrating the latch of FIG. 10 as seen facing the base.

Referring to FIGS. 8 and 10-11, the platform 133 of the PCB holder 120 includes an aperture 136 that permits an electronic component 8 mounted on a PCB holder-facing surface 17 of the PCB 12 to protrude therethrough. The aperture 136 is disposed between an end portion 134e of the holder sidewall 134 along the assembly second end 39 and a longitudinal midpoint of the PCB holder 120, and is spaced apart from the holder sidewall end portion 134e. A step discontinuity in the platform 133 extends between the aperture 136 and the holder sidewall end portion 134e, forming a rectangular recess 138 that opens facing the base 3. The recess 138 is aligned with the longitudinal axis 21 and a pair of teeth 153, 154 protrude from a base-facing surface 139 of the recess 138.

The recess 138 and the pair of teeth form a latch 150 that provides a connection between the front assembly 4 and the locking mechanism 100. In particular, the latch 150 includes the pair of longitudinally-spaced teeth 153, 154 that are configured to cooperatively engage with the cam 102 of the locking mechanism 100. The pair of teeth 153, 154 includes a drive tooth 154 that protrudes from the base-facing surface 139 of the recess 138 at the intersection of the recess 138 and the holder sidewall end portion 134e, and a latching tooth 153 that that protrudes from the base-facing surface 139 of the recess 138 at the intersection of the recess 138 and the aperture 136. The latching tooth 153 and the drive tooth 154 each protrude toward the base 3. Surfaces of the latching tooth 153 and the drive tooth 154 facing the base 3, as well as the holder sidewall end portion 134e in the vicinity of the recess 138, may be irregularly shaped, i.e., including grooves, cutouts, etc. The irregular shape of these surfaces permit clearance of the latch 150 relative to the locking mechanism 100 during assembly and disassembly of the front assembly 4 with the base 3.

To form the assembled sensor subassembly 5, the PCB 12 is received within the PCB holder 120. The PCB 12 is disposed within the PCB holder 120 so as to abut, and be surrounded by, the holder sidewall 134. In addition, the PCB 12 rests spaced above the platform 133 on standoffs 135 that project from the platform 133.

Referring to FIGS. 12 and 13, the cover subassembly 6 includes a lens holder 80 and a lens 60 that is supported on the lens holder 80. The lens holder 80 underlies and supports a sensor-facing surface 62 of the lens 60, as discussed further below.

The lens 60 is a curved, plate shaped element in which the peripheral edge includes a pair of linear long edges 67a, 67b, and a pair of curved short edges 68a, 68b that join, and extend generally transversely to, the long edges 67a, 67b. As a result, the lens 60 has a generally rectangular profile when viewed facing the lens 60 (e.g., in front plan view). In addition, the lens 60 has an arcuate profile when viewed from the first end 38 or second end 39. For example, the mid portion 78 of the lens 60 is spaced apart from a line 77 that passes through the long edges 67a, 67b of the lens element 60. The lens 60 includes the sensor-facing surface 62, and an outward-facing surface 61 that is opposed to the sensor-facing surface 62.

The lens 60 is thin. In particular, the thickness of the lens 60 is very small relative to the dimensions of the lens 60 along the long edges 67a, 67b and short edges 68a, 68b. As used here, the term lens thickness corresponds to the distance between the outward-facing surface 61 and the sensor-facing surface 62.

The lens 60 includes a first rib 70a that protrudes from the sensor-facing surface 62 adjacent the first long edge 67a, and a second rib 70b that protrudes from the sensor-facing surface 62 adjacent the second long edge 67b. The first and second ribs 70a, 70b extend in parallel with the first and second long edges 67a, 67b. The first and second ribs 70a, 70b are slightly spaced apart from the respective first and second long edges 67a, 67b, whereby an interior corner 73 is defined between the first rib 70a and the first long edge 67a and between the second rib 70b and the second long edge 67b. The ribs 70a, 70b are not longitudinally continuous since they each contain a pair of spaced rib openings 74. The rib openings 74 are aligned with the PCB holder snaps 132, and permit the PCB holder snaps 132 pass through the ribs 70a, 70b during assembly.

Figure 14:
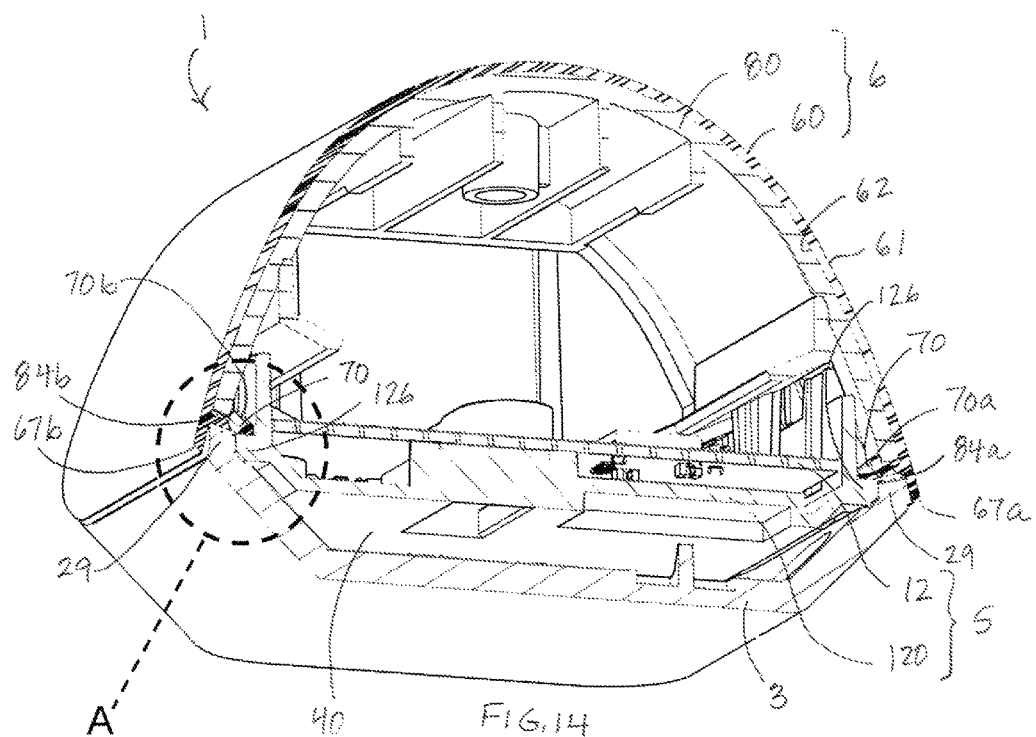
FIG. 14 is a cross-sectional view of the housing as seen along line C-C of FIG. 1.
Figure 15:
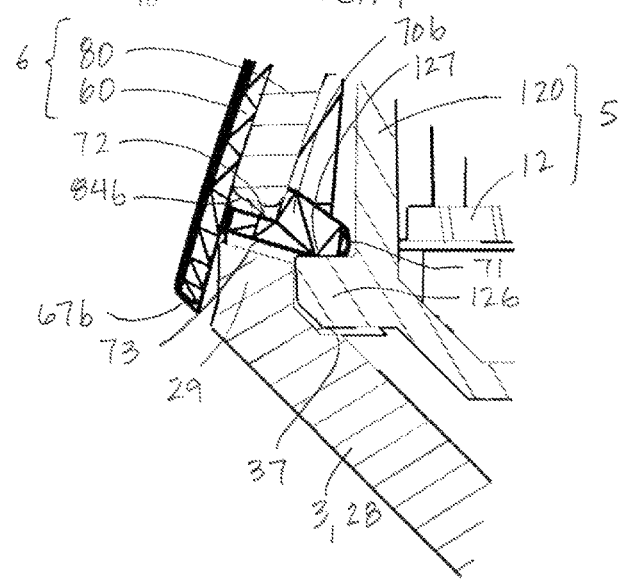
FIG. 15 is a detail cross-sectional view of a portion of the housing labeled as A in FIG. 14.

Referring to FIGS. 14 and 15, the first and second ribs 70a, 70b are each formed having a groove 72 shaped and dimensioned to receive a portion of the peripheral edge of the lens holder 80, as discussed further below. The groove 72 is located on a surface of the rib 70a, 70b that faces away from the respective interior corner 73. Thus, the sensor-facing surface 62 of the lens 60 is supported by the lens holder 80 in such a way that the lens holder 80 is obstructed from view when the motion detection device 1 is viewed from the front. In addition, the first and second ribs 70a, 70b are of sufficient length that the rib free ends 71 are supported on a cover facing surface 127 of a corresponding rail 126 of the PCB holder 120, as discussed further below.

Referring to FIGS. 9 and 12-13, the lens holder 80 includes a curved plate 81 reinforced by connecting transverse trusses 82a, 82b, 82c formed on a PCB-facing surface 83 of the curved plate 81. The curved plate PCB-facing surface 83 has a rectangular profile when viewed from the rear, and includes long edges 84a, 84b that are joined at each end of the lens holder 80 via short edges 85a, 85b that correspond to end trusses 82a, 82b. The curved plate 81 and trusses 82a, 82b, 82c define compartments that receive the PIR sensor 7, battery packs (not shown), etc. In addition, the curved plate 81 includes a relatively large opening 86 adjacent one end truss 82b that permits radiant energy to pass through lens holder 80 to the PIR sensor 7 disposed on the PCB 12, and a relatively small opening 87 between the large opening and the opposed short edge 85a that overlies the indicator LED disposed on the PCB 12 and permits radiant energy to pass from the indicator LED to pass through the lens holder 80.

The arcuate shape of the lens holder 80 gives the lens 60 its corresponding arcuate shape. In addition, the lens holder 80 reinforces and stabilizes the arcuate shape of the lens 60. To this end, the lens holder 80 is provided in a material that is more rigid than the material used to form the lens 60. For example, if the lens 60 is formed of polyethylene, the lens holder 80 may be formed of acrylonitrile butadiene styrene (ABS).

The lens holder 80 includes retaining features that retain the front assembly 4 in an assembled position in which the front assembly 4 closes the open end of the base 3. In particular, the lens holder 80 includes retaining hooks 88 formed on one end truss 82b. The retaining hooks 88 are rectangular tabs that protrude inward in a direction parallel to the longitudinal axis 21, and are configured to engage with retaining eyes 35 formed on the base 3. The engagement of the lens holder retaining hooks 88 with the base retaining eyes 35 serves to retain the front assembly 4 in an assembled position relative to the base 3 when used in conjunction with other retaining features, as discussed further below.

The lens holder 80 includes a pair of longitudinally-spaced recesses 89 formed on the PCB-facing surface 83 of the curved plate 81 at a location adjacent each long edge 84a, 84b. The recesses 89 are positioned to correspond to the location of the snaps 132 formed on the PCB holder sidewalls 134. The recesses 89 have a rectangular shape to correspond to the rectangular shape of the snaps 132. The curved plate 81 is thickened along an edge of each recess 89 that is closest and parallel to the corresponding long edge 84a, 84b, forming a ridge 92 that enhances engagement of the snap 132 with a respective recess 89.

Referring again to FIGS. 14 and 15, the lens 60 overlies the curved plate 81 of the lens holder 80, and the long edges 84a, 84b of the lens holder 80 are received within a corresponding longitudinally extending groove 72 of the lens ribs 70a, 70b to form the assembled cover subassembly 6. Since each of the long edges 84a, 84b of the lens holder 80 is disposed in a corresponding groove 72, the long edges 84a, 84b are enclosed by the lens 60 and its ribs 70a, 70b. As a result, the lens holder 80 is not visible when the motion detection device 1 is viewed when facing the lens (e.g., as seen in front plan view), and the lens 60 alone provides the visible cover of the housing 2.

To form the assembled front assembly 4, the cover subassembly 6 (e.g., the lens 60 supported on the lens holder 80) is assembled with the sensor subassembly 5 (e.g., the PCB 12 supported on the PCB holder 120) with the PCB holder snaps 132 in engagement with the lens holder recesses 89, whereby the cover subassembly 6 is retained on the sensor subassembly 5.

In addition, when the cover subassembly 5 is assembled with the sensor subassembly 6, the rails 126 of the PCB holder 120 are disposed in the slots 37 of the base 3, the base sidewall free ends 29 are positioned in the corresponding interior corner 73 defined between the lens long edge 67a, 67b and the corresponding rib 70a, 70b. Thus, the lens 60 overlies a portion of the base sidewall 28, whereby the base 3 is not visible when the motion detection device 1 is viewed from the front.

When the cover subassembly 6 is assembled with the sensor subassembly 5 by engaging the PCB holder snaps 132 with the lens holder recesses 89, the free ends 71 of the lens ribs 70a, 70b rest on the cover-facing surface 127 of the rails 126 of the PCB holder 120. Since the PCB holder snaps 132 retain the lens holder 80 in the assembled position relative to the PCB holder 120, the free ends 71 of the lens ribs 70a, 70b are prevented from deflection, whereby the lens holder long edges 84a, 84b are securely retained within the grooves 72, and thus the lens 60 is securely retained on the lens holder 80.

When the housing 2 is assembled, the front assembly 4, which includes the cover subassembly 6 connected to the sensor subassembly 5, is mounted on the base 3 such that the sensor subassembly 5 is disposed between the cover subassembly 6 and the base 3. The retaining features 35, 36, 88, 130 are used in combination with the locking mechanism 100 in order to retain the front assembly 4 in connection with the base 3. In particular, the rails 126 of the PCB holder 120 of the front assembly 4 are supported within the slots 37 of the base 3 while the base retaining eyes 35 are engaged with the lens holder retaining hooks 88 and the base retaining hooks 36 are engaged with the PCB holder retaining eyes 130. To engage or disengage the retaining eyes 35, 130 and hooks 36, 88, the front assembly 4 is slid longitudinally relative to the base 3 along the slots 37. Once the retaining eyes 35, 130 and hooks 36, 88 are engaged, the front assembly 4 is prevented from reverse sliding along the base slots 37 to a disengaged position by the locking mechanism 100.

Referring to FIGS. 16A and 16B, the locking mechanism 100 includes an actuator in the form of the cam 102 and an elastic element such as a torsion spring 140. The torsion spring 140 is used to bias the cam 102 toward an engaged and locked position in which the front assembly 4 is prevented from moving relative to the base 3 along the slots 37.

The cam 102 is a generally elongated cylindrical member that has a first end 104, a second end 105 opposed to the first end 104, and a rotational axis 106 that extends through the first and second ends 104, 105.

The cam first end 104 includes a reduced diameter portion 115 that is shaped and dimensioned to be received within the port 34. The reduced diameter portion 115 terminates in a generally planar end face 107 having surface features that are shaped and dimensioned to engage with a tool (not shown). In the illustrated embodiment, a slot 114 is provided on the end face 107 that receives the tip of a flat blade screw driver, but the end face surface features are not limited to a slot configuration. The cam first end reduced diameter portion 115 is received within the port 34 such that the end face 107 is generally flush with an outer surface of the base sidewall 28. Since the cam end face 107 is generally flush with an outer surface of the base sidewall 28, the tool must be used to actuate the cam 102. These features provide a motion detection device 1 that is more tamper resistant than some conventional motion detection devices that do not include a flush-mounted locking mechanism 100.

In addition, the first end reduced diameter portion 115 is rotatably supported within the port 34. A stop 112 protrudes radially from the cam first end 104 and is shaped and to abut the shoulders 43a, 43b of the base first bearing member 41 at predetermined rotational orientations of the cam 102, thereby serving to limit the amount of rotation of the cam 102 about the rotational axis 106.

The cam second end 105 has a reduced diameter portion 111 providing an axially-extending post. The post 111 is rotatably supported on the second curved bearing surface 45 of the base second bearing member 44. In the illustrated embodiment, the post 111 is retained on the bearing surface 45 via a snap fit engagement between the high shoulders 46 of the base second bearing member 44.

An outer surface of the cam 102 is formed having a first cut out 113 adjacent to the first end 104 and a second cut out 117 adjacent to the second end 105. The first cut out 113 has the form of a helical groove that is concentric with the cam rotational axis 106, whereby the cam 102 has a helically-shaped first cam surface 109. The helical groove 113 is configured to receive and engage with the latch drive tooth 154 in such a way that rotation of the cam 101 about the cam rotational axis 106 results in a translation of the front assembly 4 relative to the base 22 in a direction parallel to the cam rotational axis 106 as well as the base longitudinal axis 21.

The second cut out 117 includes an annular groove 110 formed in the end face 108 of the second end that partially surrounds the post 111. In some embodiments, the annular groove 110 extends along an arc of about 180 degrees, forming a semi-circular path. The annular groove 110 receives the coiled portion and a first end 142 of the spring 140, whereby the post 111 is surrounded by the spring 140. The second cut out 117 defines a transverse shoulder 118 that is spaced apart from the end face 108 of the second end 105, and is disposed on a side of the post 111 that is opposed to the annular groove 110. The second cut out 117 also defines a second helical surface 119 that extends from the shoulder 118 toward the second end 105 along a portion of the annular groove 110.

The spring 140 is a torsion spring and includes the first end 142 that is disposed in the cam annular groove 110, and a second end 144 that abuts the inward-facing surface of the base bottom 23. The spring 140 is oriented so as to rotationally bias the cam 102 toward the locked position. Thus, actuation of the locking mechanism 100 via the tool to move the cam 102 away from the locked position increases the force of the spring 140 on the cam 102, whereby upon removal of the tool, the cam 102 returns automatically to the locked position.

Referring to FIGS. 17-20, in use, the cam 102 is rotatable between a locked position and an unlocked position. When the cam 102 is in the locked position, the stop 112 abuts the low shoulder 43a of the first bearing member 41, the latching tooth 153 engages the cam second end face 108 and the drive tooth 154 is spaced apart from the cam surface 109 of the cam helical groove 113 (FIG. 17). Engagement of the latching tooth 153 with the end face 108 prevents longitudinal movement of the front assembly 4 relative to the base 3 in a direction in which the retaining hooks 36, 88 can disengage from the retaining eyes 35, 130.

The cam helical groove 113 is shaped so that when the cam 102 is rotated to the unlocked position, for example by rotation of the cam 102 about the rotational axis 106, the latching tooth 153 becomes spaced apart from the cam second end face 108 and the drive tooth 154 engages with the cam surface 109 of the cam helical groove 113 (FIG. 18).

The cam 102 is further rotatable beyond the unlocked position to an ejecting position in which the stop 112 abuts the high shoulder 43b of the first bearing member 41. During cam rotation to the ejecting position, the drive tooth 154 is translated via engagement with the cam surface 109. That is, when the cam 102 is rotated beyond the unlocked position, the drive tooth 154 is displaced toward the base sidewall 28 (FIG. 19) relative to a position of the drive tooth 154 when the cam 102 is in the locked position. As a result, the front assembly 4 is ejected from the base 3, e.g., the front assembly 4 is longitudinally displaced relative to base 3 to an extent that the retaining hooks 36, 88 disengage from the retaining eyes 35, 130. In particular, the rail 126 slides longitudinally along the slot 37 until the retaining hooks 36, 88 are released and spaced apart from the corresponding retaining eyes 35, 130. In this position, the front assembly 4 can be manually lifted off the base 3, permitting the user to access the interior of the motion detection device 1, for example to replace a battery.

As previously discussed, the cam 102 is spring biased toward the locked position, whereby upon release of the tool, the locking mechanism 100 is automatically reset since the cam 102 is returned to the locked position via the spring 140 (FIG. 20). This feature permits the front assembly 4 to be automatically locked in place when reassembled (for example, via a slam action) on the base 3. Slam action is achievable by the flexing of latching tooth and surrounding area when front assembly is pushed towards the wall and retaining features 35, 36, 88, 130 are reengaged.

By providing the motion detection device 1 with the auto-locking locking mechanism 100, the front assembly 4 is automatically locked to the base upon assembly. As a result, a situation in which an installer forgets to set the lock after mounting the motion detection device 1 to a wall is avoided.

The housing assembly 2 includes the cover subassembly 6 that includes the lens 60 which is supported on the sensor-facing surface 62 in such a way that the lens holder 80 is not seen in front plan view or side view. In addition, the lens 60 is formed in such a way that the outward-facing surface 61 of the lens 60 is smooth, continuous and without visible surface features so as to provide a motion detection device 1 having cover surface that is frameless, and has minimal shadow lines and joints on the cover. As a result, the motion detector device 1 has a clean, unobtrusive appearance that permits the motion detector device 1 to blend in with its surroundings.

In the motion detection device 1 described above, the locking mechanism 100 is supported within the base 3, and the latch 150 is part of the PCB holder of the front assembly 4. However, the motion detection device 1 is not limited to this configuration. For example, in an alternative embodiment, the locking mechanism may be supported by the front assembly 4, and the latch 150 may be formed in the base 3.

In the illustrated embodiment, the base 3 includes a generally elongated rectangular bottom 23, whereby the front view profile of the motion detection device 1 has a generally elongated rectangular shape (FIG. 3). However, the shape of the base 3 and the front view profile of the motion detection device are not limited to an elongated rectangular shape, and possible alternative shapes include square, pentagonal or other polygonal shapes, as well as shapes having curved sides.

The housing assembly 2 includes retaining elements that retain the front assembly 4 in a closed position relative to the base 3. As previously described, the base 22 includes retaining eyes 35 and retaining hooks 36 that engage with corresponding retaining eyes 130 and retaining hooks 88 provided on the front assembly 4. However, it is understood that the type and placement of retaining elements described herein are non-limiting, whereby a different arrangement of retaining eyes and retaining hooks can be employed, or alternatively, other types of retaining elements can be employed.

In the illustrated embodiment, the platform 133 of the PCB holder 120 includes the aperture 136 that permits an electronic component 8 mounted on a PCB holder-facing surface 17 of the PCB 12 to protrude therethrough, and the rectangular recess 138 is provided that extends between the aperture 136 and the holder sidewall end portion 134e. However, in other embodiments, for example motion detection devices that include different sensor packages, the aperture 136 may be omitted from the platform 133. In such embodiments, the recess 138 remains in place adjacent the sidewall end portion 134e, whereby the latch 150 is configured to engage the locking mechanism 100.

Although the front assembly 4 has been described herein as an assembly of two subassemblies (e.g., the cover subassembly 6 including the lens 60 supported on the lens holder 80 and the sensor subassembly 5 including the PCB 12 supported on the PCB holder 120), the front assembly 4 may be formed by assembling the same four elements (e.g., the lens 60, the lens holder 80, the PCB 12 and the PCB holder 120) without prior formation of the particular subassemblies.

Although the housing 2 is described herein as part of a motion detection device 1 that supports a passive infrared (PIR) motion sensor 7, the housing is not limited to supporting a PIR motion sensor and the device is not limited to motion sensing. For example, the housing can support other types of electronic components including other types of sensors, and/or may include illumination sources, where the electronic component is arranged to face the lens 60, and to receive and/or transmit electromagnetic radiation through the lens.

In the illustrated embodiment, the base 3 includes a generally elongated rectangular bottom 23, whereby the front view profile of the motion detection device 1 has a generally elongated rectangular shape (FIG. 3). However, the shape of the base 3 and the front view profile of the motion detection device are not limited to an elongated rectangular shape, and possible alternative shapes include square, pentagonal or other polygonal shapes, as well as shapes having curved sides.

Selective illustrative embodiments of the device are described above in some detail. It should be understood that only structures considered necessary for clarifying the device have been described herein. Other conventional structures, and those of ancillary and auxiliary components of the device, are assumed to be known and understood by those skilled in the art. Moreover, while a working example of the device has been described above, the device is not limited to the working example described above, but various design alterations may be carried out without departing from the device as set forth in the claims.

What is claimed, is:

1. A housing assembly comprising
a base,
a front assembly configured to engage with the base,
a latch that protrudes inward from an inner surface of one of the front assembly and the base, and
a cam supported on the other of the front assembly and the base,
wherein the cam is rotatable about a rotational axis and includes a cam surface that is engaged with the latch in such a way that rotation of the cam about the rotational axis results in a translation of the front assembly relative to the base in a direction parallel to the rotational axis.

2. The housing assembly of claim 1, wherein
the base includes a bottom and a sidewall that surrounds a peripheral edge of the bottom,
the sidewall includes a port, and the cam is supported within the base such that a first end of the cam is disposed in the port, and
the latch includes a proximal end fixed to the front assembly, a distal end defining a latching tooth, and a drive tooth disposed between the proximal and distal ends that is engaged with the cam surface in some rotational orientations of the cam and is disengaged from the cam surface in other rotational orientations of the cam.

3. The housing assembly of claim 2, wherein the cam is rotatable between a locked position in which the front assembly closes all of an open end of the base, the latching tooth engages an end face of the cam and the driving tooth is spaced apart from the cam surface, and an unlocked position in which the latching tooth is spaced apart from the end face of the cam and the driving tooth is engaged with the cam surface.

4. The housing assembly of claim 3, wherein the housing assembly comprises a spring that biases the cam toward the locked position.

5. The housing assembly of claim 3, wherein the cam is rotatable to an ejecting position in which the driving tooth is displaced relative to a position of the drive tooth when the cam is in the locked position, whereby the front assembly is displaced relative to a position of the front assembly when the front assembly is in the closed position.

6. The housing assembly of claim 2, wherein the first end of the cam includes surface features configured to engage with a tool.

7. The housing assembly of claim 1, wherein the cam surface of the cam is helical in shape.

8. The housing assembly of claim 1, wherein
the base includes one of a retaining hook and a retaining eye,
the front assembly includes the other of the retaining hook and the retaining eye, and
the retaining eye is configured to receive and retain the retaining hook.

9. The housing, assembly of claim 8, wherein when the front assembly is in a closed position relative to the base, the retaining hook is disposed within the retaining eye such that the front assembly is retained in the closed position relative to the base, and when the cover is translated relative to the base via the cam, the retaining hook is released from the retaining eye such that the front assembly is removable from the base.

10. The housing assembly of claim 1, wherein the cam includes an annular groove that at least partially surrounds an end of the cam, and at least a portion of a spring is disposed in the groove.

11. The housing assembly of claim 10, wherein the spring is a torsion spring including one end disposed in the groove and another end that abuts the housing base.

12. The housing assembly of claim 1, wherein
one end of the cam includes an axially extending post,
a bearing member protrudes from the bottom of the base, and
the post is rotatably supported on the bearing member.

13. The housing assembly of claim 1, wherein
a bearing member protrudes from the bottom of the base, and
the cam includes a radially-protruding stop that is configured to limit the rotational travel of the cam by engaging a portion of the bearing member at a predetermined rotational orientation of the cam.

14. The housing assembly of claim 1, wherein the housing assembly further comprises
a sensor assembly supported on the base, the sensor assembly including a support frame and a printed circuit board that is supported on the support frame,
a sensor electrically connected to, and supported on, a surface of the printed circuit board that faces away from the support frame, and
a lens that forms an outer surface of the front assembly and is configured to direct light toward the sensor.

15. The housing assembly of claim 1, wherein the lens encloses a peripheral edge of the base and overlies the sensor.

16. A method of manipulating a housing assembly, the housing assembly comprising
a base,
a front assembly configured to engage with the base,
a latch that protrudes inward from an inner surface of one of the front assembly and the base, and
a cam supported on the other of the front assembly and the base, the cam including a cam surface that is engaged with the latch in such a way that rotation of the cam about the rotational axis results in a translation of the front assembly relative to the base in a direction parallel to the rotational axis,
the method comprising
rotating the cam about a rotational axis to an extent that the front assembly translates relative to the base in a direction parallel to the rotational axis.

17. The method of claim 16, wherein
the housing assembly further comprises an eye that protrudes from one of the front assembly and the base, and a hook that protrudes from the other of the front assembly and the base and is configured to be received within the eye, and
rotation of the cam about the rotational axis by a predetermined amount results in translation of the front assembly relative to the base between a locked position in which the hook is received within the eye, and an unlocked position in which hook is spaced apart from the eye, the method further comprising
rotation of the cam about the rotational axis by the predetermined amount to place the housing assembly in the unlocked position, and
when the housing assembly is in the unlocked position, lifting the front assembly off the base.

18. A housing assembly comprising
a base,
a front assembly configured to engage with the base,
a latch that protrudes inward from an inner surface of one of the front assembly and the base, and
a cam supported on the other of the front assembly and the base,
wherein
the cam is rotatable about a rotational axis and includes a cam surface that is eneaced with the latch in such a way that rotation of the cam about the rotational axis results in a translation of the front assembly relative to the base in a direction parallel to the rotational axis,
the base includes a bottom and a sidewall that surrounds a peripheral edge of the bottom,
the sidewall includes a port, and the cam is supported within the base such that a first end of the cam is disposed in the port, and
the latch includes a proximal end fixed to the front assembly, a distal end defining a latching tooth, and a drive tooth disposed between the proximal and distal ends that is engaged with the cam surface in some rotational orientations of the cam and is disengaged from the cam surface in other rotational orientations of the cam.

* * * * *

UNITED STATES PATENT AND TRADEMARK OFFICE
CERTIFICATE OF CORRECTION

PATENT NO. : 10,072,985 B2
APPLICATION NO. : 14/922804
DATED : September 11, 2018
INVENTOR(S) : Craig Peterson It is certified that error appears in the above-identified patent and that said Letters Patent is hereby corrected as shown below:

In the Claims

Column 14, Lines 27-28, Lines 1-2 of Claim 9 should read:
9. The housing assembly of claim 8, wherein when the
front assembly is in a closed position relative to the base, the Column 16, Lines 11-12, Lines 9-10 of Claim 18 should read:
the cam is rotatable about a rotational axis and includes a
    cam surface that is engaged with the latch in such a way Signed and Sealed this
Fifth Day of March, 2019

Andrei Iancu
*Director of the United States Patent and Trademark Office*